United States Patent
Lee et al.

(10) Patent No.: US 7,967,903 B2
(45) Date of Patent: Jun. 28, 2011

(54) INK COMPOSITION

(75) Inventors: Chuan-Hsi Lee, Taoyuan Hsien (TW); Hsiao-San Chen, Taoyuan Hsien (TW)

(73) Assignee: Everlight USA, Inc., Pineville, NC (US)

( * ) Notice: Subject to any disclaimer, the term of this patent is extended or adjusted under 35 U.S.C. 154(b) by 224 days.

(21) Appl. No.: 12/320,381

(22) Filed: Jan. 26, 2009

(65) Prior Publication Data

US 2009/0211488 A1    Aug. 27, 2009

(30) Foreign Application Priority Data

Feb. 25, 2008 (CN) .......................... 2008 1 0081322

(51) Int. Cl.
| | |
|---|---|
| C09D 11/00 | (2006.01) |
| C09B 62/085 | (2006.01) |
| C09B 62/095 | (2006.01) |
| C09B 62/10 | (2006.01) |
| C09B 62/51 | (2006.01) |
| C09B 62/513 | (2006.01) |

(52) U.S. Cl. ............... 106/31.48; 106/31.47; 106/31.51; 106/31.52; 106/31.58; 8/549

(58) Field of Classification Search ............... 106/31.48, 106/31.47, 31.52, 31.51, 31.58; 8/549
See application file for complete search history.

(56) References Cited

U.S. PATENT DOCUMENTS

| | | | | |
|---|---|---|---|---|
| 5,108,503 | A | * | 4/1992 | Hindagolla et al. ....... 106/31.47 |
| 5,431,722 | A | * | 7/1995 | Yamashita et al. ......... 106/31.47 |
| 6,015,454 | A | * | 1/2000 | Lacroix et al. ............. 106/31.47 |
| 6,176,913 | B1 | * | 1/2001 | Kasperchik et al. ....... 106/31.48 |
| 6,503,308 | B2 | * | 1/2003 | Stramel et al. ............. 106/31.52 |
| 6,780,229 | B2 | * | 8/2004 | Hopper et al. ............. 106/31.47 |
| 7,294,183 | B2 | * | 11/2007 | Tyvoll ........................ 106/31.47 |
| 2003/0172840 | A1 | * | 9/2003 | Blank et al. ................ 106/31.47 |
| 2007/0263058 | A1 | * | 11/2007 | Sao et al. ................... 106/31.58 |
| 2008/0178766 | A1 | * | 7/2008 | McGorrin ................... 106/31.48 |

* cited by examiner

*Primary Examiner* — Helene Klemanski
(74) *Attorney, Agent, or Firm* — Bacon & Thomas, PLLC

(57) ABSTRACT

The present invention relates to a novel ink composition and, more particularly, to an ink composition for digital textile printing, which is suitable for ink-jet printing on cellulose fiber materials. The novel ink composition of the present invention has stable pH value, fine storage stability, smoothness and ease in printing, and reduction in color deterioration.

8 Claims, No Drawings

INK COMPOSITION

BACKGROUND OF THE INVENTION

1. Field of the Invention

The present invention relates to a novel ink composition and, more particularly, to an ink composition for digital textile printing, which is suitable for ink-jet printing on cellulose fiber materials.

2. Description of Related Art

Ink-jet printing is one kind of non-impact printing technology, and the required technical feature of the ink-jet printing is to provide images with sharpness and clearness. In order to obtain images with excellent printing quality, the ink used in ink-jet printing must show high light fastness, optical density, solubility, storage stability, and smoothness and ease of printing.

The ink-jet printing is applied in textile industry for many years. This method can be performed without use of a printing screen, so it is possible to save a lot of time and cost. Therefore, the ink-jet printing is suitable for production conditions of variation, small quantity, and customization, particularly.

From the application point of view, the ink for the ink-jet printing must have some unique properties that are different from general inks. The ink composition for the ink-jet printing should not only meet the requirements for viscosity, stability, surface tension, and fluidity, but also meet the requirements for color strength, fixation, fiber-dye bonding stability, and wet fastness.

The ink composition for the ink-jet printing comprises water-soluble dye or water-dispersible pigment; wherein the dye or the pigment can be soluble or disperse in water, or in a liquid medium containing water-soluble organic solvent. In addition, the ink composition can further comprise a surfactant, which can modify the properties of the ink, to meet the requirement for the textile ink-jet printing.

U.S. Pat. No. 6,780,229 has disclosed an ink composition, which comprises an organic buffer to maintain the pH value of the ink composition between 4 to 8. U.S. Pat. No. 6,015,454 has disclosed another ink composition, which comprises at least one reactive dye, and 1,2-propylene glycol or N-methyl-2-pyrrolidone, to improve the color strength and fixation. However, this ink composition has a problem in storage stability, durable printing stability, and nozzle clogging. US 2003/0172840 has disclosed another ink composition, which comprises at least one dye, sulfolane, and a buffer system, to prevent the problems of storage stability and nozzle clogging. Unfortunately, the chlorine-resistance fastness, high color strength, and dye solubility of this ink composition are not good enough.

Hence, it is desirable to provide an ink composition for digital textile printing, which exhibits high pH stability, low color deterioration, high color strength, and high dye concentration.

SUMMARY OF THE INVENTION

The object of the present invention is to provide a novel ink composition, which exhibits high pH stability, good storage stability, smoothness and ease in printing, and reduction in color deterioration.

The present invention provides an ink composition for digital textile printing, which comprises:

(A) a reactive dye, which is presented in an amount of 95~99.9% by weight; and (B) an organic buffer, which is presented in an amount of 0.1~5% by weight.

Specific examples of the aforementioned component (A) are represented as following formulas (I-1) to (I-16):

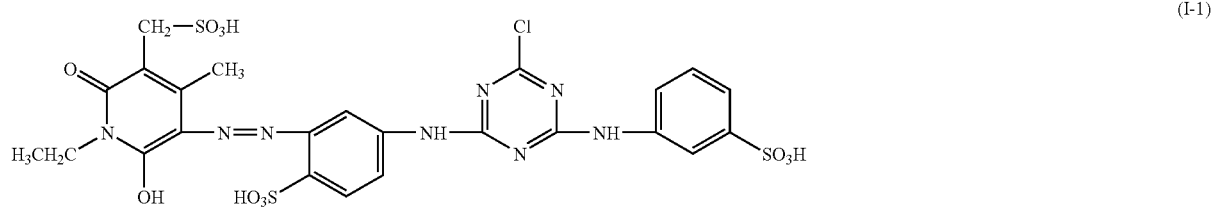

(I-1)

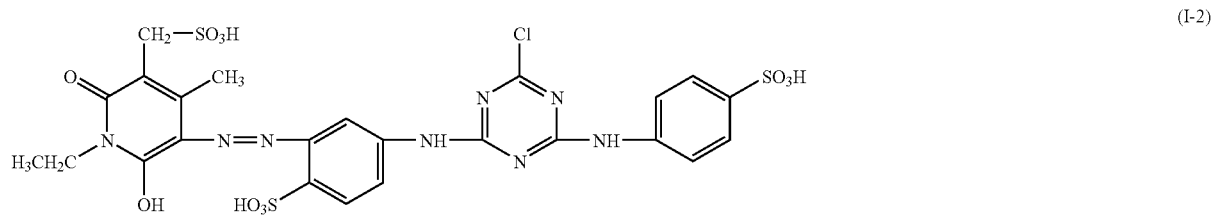

(I-2)

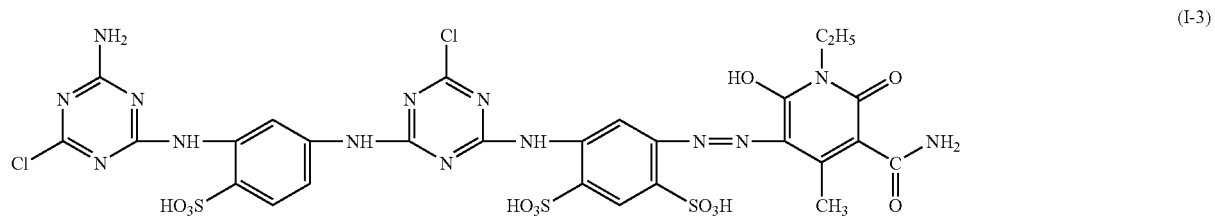

(I-3)

-continued
(I-4)
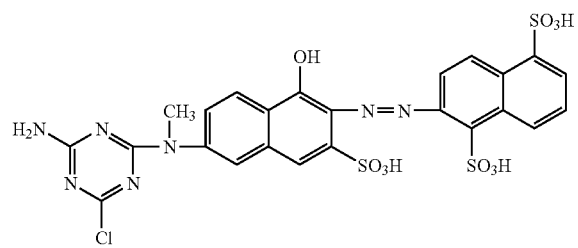
(I-5)
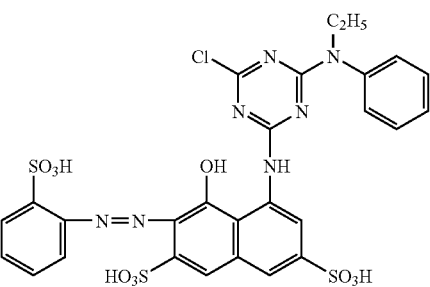
(I-6)
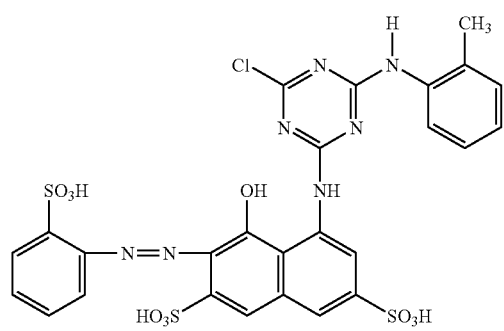
(I-7)
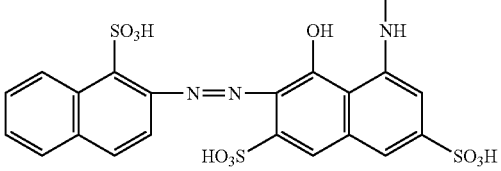
(I-8)
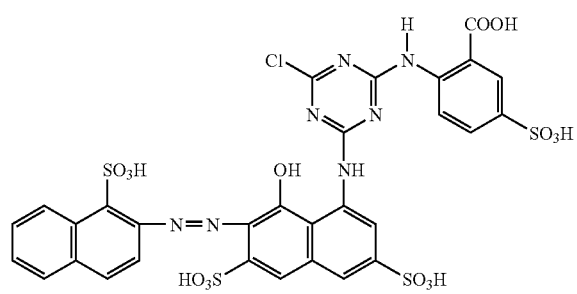
(I-9)
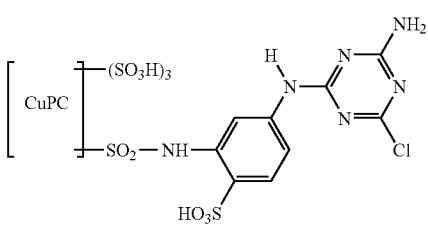
(I-10)
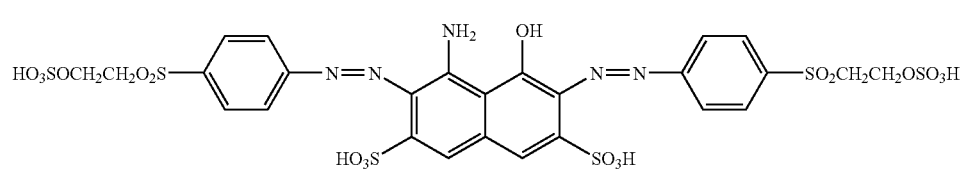
(I-11)
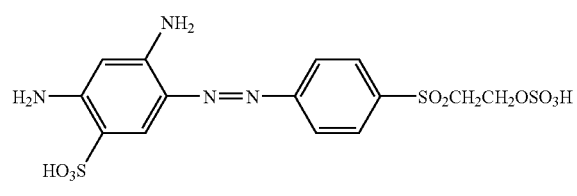
(I-12)
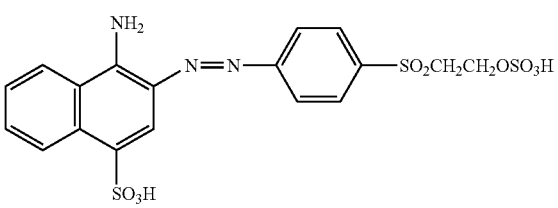

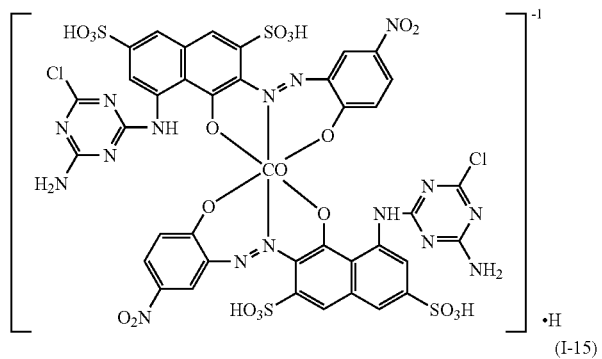 (I-13)

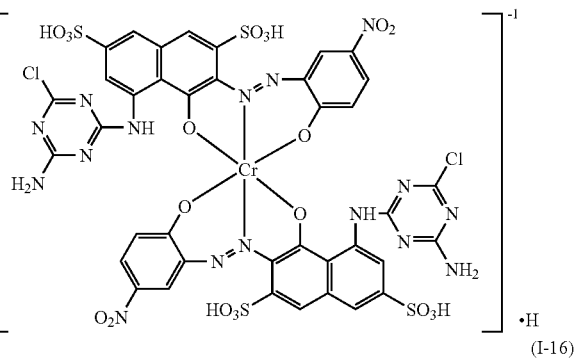 (I-14)

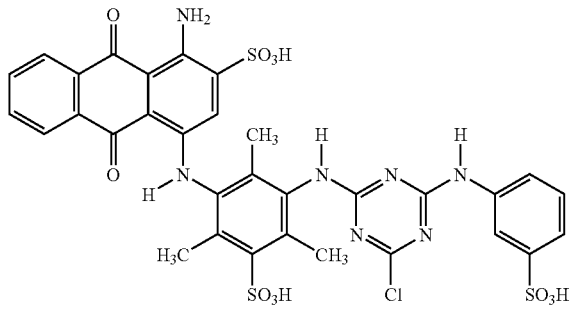 (I-15)

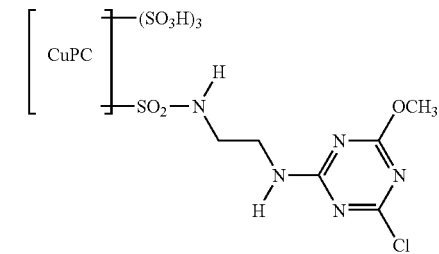 (I-16)

Furthermore, according to the ink composition for digital textile printing of the present invention, the component (A) may be a single dye, or a mixture of multiple reactive dyes.

Specific examples of the aforementioned component (B) are represented as following formulas (II-1) to (II-2):

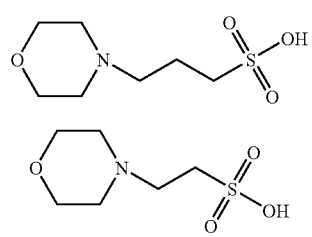

According to the ink composition for digital textile printing of the present invention, the compounds of formulas (I-1) to (I-16) and formulas (II-1) to (II-2) are represented in the form of free acid. However, in practice, these compounds may be metallic salts or ammonium salts thereof. More likely, these compounds may be alkaline metallic salts or ammonium salts thereof.

Besides, according to the ink composition for digital textile printing of the present invention, the ink composition not only comprises the component (A) and the component (B), but further comprises: (C) an organic solvent, and (D) water. The organic solvent of the component (C) is selected form the group consisting of ethylene glycol, diethylene glycol, triethylene glycol, propylene glycol, butylene glycol, ethylene glycol monoethyl ether, ethylene glycol monobutyl ether, diethylene glycol monobutyl ether, diethylene glycol monoethyl ether, diethylene glycol monomethyl ether, glycerine, 2-pyrrolidone, N-methyl-2-pyrrolidone, 1,3-dimethyl-2-imidazolidinone, and triethanolamine. Moreover, the content of the component (A) is 0.095~33.25% by weight; the content of the component (B) is 0.005~1.75% by weight; the content of the component (C) is 5~35% by weight; and the content of the component (D) is 30~94.9% by weight.

Furthermore, the ink composition for digital textile printing of the present invention can further comprise: (E) nonionic surfactant, which is presented in an amount of 0.1~5% by weight. The component (E) can be alkynediol based surfactant, or alkoxy surfactant. Specific examples of the alkynediol based surfactant includes: Surfynol 485, Surfynol 465, Surfynol 440, Surfynol 420, Surfynol 104 (commercially available from Air Products & Chemicals, Inc.), and specific examples of the alkoxy surfactant includes: Tergitol 15-S-5, Tergitol 15-S-7, Tergitol 15-S-9 (commercially available from Union Carbide).

Moreover, the ink composition for digital textile printing of the present invention may further comprises (F) microbicide, if necessary. The content of the component (F) is 0.01~1% by weight based on the total weight of the ink composition. Specific examples of the microbicide (F) includes: NUOSEPT (commercially available from Nudex Inc., a division of Huls Americal), UCARCIDE (commercially available from Union Carbide), VANCIDE (commercially available from RT Vanderbilt Co.), and PROXEL (commercially available from ICI Americas). The aforementioned additives are disclosed in TW 589352 or U.S. Pat. No. 5,725,641.

Other objects, advantages, and novel features of the invention will become more apparent from the following detailed description when taken in conjunction with the accompanying drawings.

DETAILED DESCRIPTION OF THE PREFERRED EMBODIMENT

The reactive dye compounds used in the present invention are commercially available from Everlight Chemical Industrial Corp. The organic buffer compounds used in the present invention are commercially available from HOPAX chemical co. LTD.

In the ink composition for digital textile printing of the present invention, the reactive dye or the organic buffer can be used alone, or combined with the aforementioned compounds or alkaline metallic salts thereof. Preferably, the salt content of these compounds should be low, i.e. total salt content in the ink composition is lower than 0.05% by weight, based on the total weight of the ink composition. Desalination can be performed on the ink composition with relative high salt content, wherein the salts are generated during production, and/or generated from diluents. The method of thin-film separation can be used for desalination, such as centrifugal filtration, nanofiltration, reverse osmosis, or dialysis.

The ink composition for digital textile of the present invention can be prepared by known methods. For example, each components with predetermined amounts is mixed in water to prepare the ink composition of the present invention.

The following examples are intended for the purpose of illustration of the present invention. However, the scope of the present invention should be defined as the claims appended hereto, and the following examples should not be construed as in any way limiting the scope of the present invention. In the present invention, the compounds are presented in form of free acid. Nevertheless, the actual form of these compounds may be metallic salts or ammonium salts thereof, and more likely, may be alkaline metallic salts or ammonium salts thereof. Without specific explanations, the unit of the parts and percentages used in the examples is calculated by weight, and the temperature is represented by Celsius degrees (° C.). The relation between the parts by weight and the parts by volume is just like the relation between kilogram and liter.

EXAMPLE 1

Preparation of a Dye Composition 50 parts of the compound of the formula (I-1), and 50 parts of the compound of the formula (I-2) were mixed with 300 parts of water, followed by adjusting the pH value of the resulted solution to 6-8. Reverse osmosis was performed to remove the salts from the resulted solution, and the content of salt is less than 0.5% by weight after desalination. Then, 2 parts of the compound of the formula (II-1) was added into the resulted solution, followed by mixing and adjusting the pH value to 6.5-7.5. Finally, the resulted solution was dried by spray drying to obtain a dye composition of the present example.

EXAMPLE 2

Preparation of a Dye Composition 100 parts of the compound of the formula (I-3) was mixed with 300 parts of water, followed by adjusting the pH value of the resulted solution to 6-8. Reverse osmosis was performed to remove the salts from the resulted solution, and the content of salt is less than 0.5% by weight after desalination. Then, 5 parts of the compound of the formula (II-1) was added into the resulted solution, followed by mixing and adjusting the pH value to 6.5-7.5. Finally, the resulted solution was dried by spray drying to obtain a dye composition of the present example.

EXAMPLE 3

Preparation of a Dye Composition 100 parts of the compound of the formula (I-4) was mixed with 300 parts of water, followed by adjusting the pH value of the resulted solution to 6-8. Reverse osmosis was performed to remove the salts from the resulted solution, and the content of salt is less than 0.5% by weight after desalination. Then, 0.1 parts of the compound of the formula (II-1) was added into the resulted solution, followed by mixing and adjusting the pH value to 6.5-7.5. Finally, the resulted solution was dried by spray drying to obtain a dye composition of the present example.

EXAMPLE 4

The method for preparing the dye composition of the present example was the same with the method illustrated in Example 2, except that the compound of the formula (I-3) was substituted with the compound of the formula (I-5).

EXAMPLE 5

The method for preparing the dye composition of the present example was the same with the method illustrated in Example 2, except that the compound of the formula (I-3) was substituted with the compound of the formula (I-6).

EXAMPLE 6

The method for preparing the dye composition of the present example was the same with the method illustrated in Example 2, except that the compound of the formula (I-3) was substituted with the compound of the formula (I-7).

EXAMPLE 7

The method for preparing the dye composition of the present example was the same with the method illustrated in Example 2, except that the compound of the formula (I-3) was substituted with the compound of the formula (I-8).

EXAMPLE 8

The method for preparing the dye composition of the present example was the same with the method illustrated in Example 2, except that the compound of the formula (I-3) was substituted with the compound of the formula (I-9).

EXAMPLE 9

Preparation of a Dye Composition 83.4 parts of the compound of the formula (I-10), 11.1 parts of the compound of the formula (I-12), and 5.5 parts of the compound of the formula (I-11) were mixed with 300 parts of water, followed by adjusting the pH value of the resulted solution to 4-6. Reverse osmosis was performed to remove the salts from the resulted solution, and the content of salt is less than 0.5% by weight after desalination. Then, 2 parts of the compound of the formula (II-2) was added into the resulted solution, followed by mixing and adjusting the pH value to 5.0-5.5. Finally, the resulted solution was dried by spray drying to obtain a dye composition of the present example.

EXAMPLE 10

Preparation of a Dye Composition 20 parts of the compound of the formula (I-13), and 80 parts of the compound of the formula (I-14) were mixed with 300 parts of water, followed by adjusting the pH value of the resulted solution to 6-8. Reverse osmosis was performed to remove the salts from the resulted solution, and the content of salt is less than 0.5% by weight after desalination. Then, 2 parts of the compound of the formula (II-1) was added into the resulted solution, followed by mixing and adjusting the pH value to 6.5-7.5. Finally, the resulted solution was dried by spray drying to obtain a dye composition of the present example.

EXAMPLE 11

The method for preparing the dye composition of the present example was the same with the method illustrated in Example 2, except that the compound of the formula (I-3) was substituted with the compound of the formula (I-15).

EXAMPLE 12

The method for preparing the dye composition of the present example was the same with the method illustrated in Example 2, except that the compound of the formula (I-3) was substituted with the compound of the formula (I-16).

EXAMPLE 13

Preparation of an Ink Composition 15 parts of the dye composition prepared in Example 1, 10 parts of N-methyl-2-pyrrolidone (component (C)), 10 parts of 2-pyrrolidone (component (C)), 0.5 parts of surfactant Surfynol 465 (component (E)), 0.2 parts of microbicide Proxel XL2 (component (F)), and water (component (D)), in the sum of 100 parts, are mixed by a mixing machine for 30 min. Then, absolute filtration was performed on the mixture with 0.45 μm filter paper to obtain an ink composition of the present example.

EXAMPLE 14

Preparation of an Ink Composition 0.1 parts of the dye composition prepared in Example 3, 5 parts of 2-pyrrolidone (component (C)), 0.5 parts of surfactant Surfynol 465 (component (E)), 0.2 parts of microbicide Proxel XL2 (component (F)), and water (component (D)), in the sum of 100 parts, are mixed by a mixing machine for 30 min. Then, absolute filtration was performed on the mixture with 0.45 μm filter paper to obtain an ink composition of the present example.

EXAMPLE 15

Preparation of an Ink Composition 35 parts of the dye composition prepared in Example 4, 35 parts of N-methyl-2-pyrrolidone (component (C)), 0.5 parts of surfactant Surfynol 465 (component (E)), 0.2 parts of microbicide Proxel XL2 (component (F)), and water (component (D)), in the sum of 100 parts, are mixed by a mixing machine for 30 min. Then, absolute filtration was performed on the mixture with 0.45 μm filter paper to obtain an ink composition of the present example.

EXAMPLE 16

The method for preparing the ink composition of the present example was the same with the method illustrated in Example 13, except that the dye composition prepared in Example 1 was substituted with the dye composition prepared in Example 6.

EXAMPLE 17

The method for preparing the ink composition of the present example was the same with the method illustrated in Example 13, except that the dye composition prepared in Example 1 was substituted with the dye composition prepared in Example 8.

EXAMPLE 18

The method for preparing the ink composition of the present example was the same with the method illustrated in Example 13, except that the dye composition prepared in Example 1 was substituted with the dye composition prepared in Example 9.

EXAMPLE 19

The method for preparing the ink composition of the present example was the same with the method illustrated in Example 13, except that the dye composition prepared in Example 1 was substituted with the dye composition prepared in Example 10.

EXAMPLE 20

The method for preparing the ink composition of the present example was the same with the method illustrated in Example 13, except that the dye composition prepared in Example 1 was substituted with the dye composition prepared in Example 11.

EXAMPLE 21

Preparation of an Ink Composition 9 parts of the dye composition prepared in Example 1, 6 parts of the dye composition prepared in Example 2, 10 parts of N-methyl-2-pyrrolidone (component (C)), 10 parts of 2-pyrrolidone (component (C)), 0.5 parts of surfactant Surfynol 465 (component (E)), 0.2 parts of microbicide Proxel XL2 (component (F)), and water (component (D)), in the sum of 100 parts, are mixed by a mixing machine for 30 min. Then, absolute filtration was performed on the mixture with 0.45 μm filter paper to obtain an ink composition of the present example.

EXAMPLE 22

The method for preparing the ink composition of the present example was the same with the method illustrated in Example 21, except that the dye composition prepared in Example 1 was substituted with the dye composition prepared in Example 5, and the dye composition prepared in Example 2 was substituted with the dye composition prepared in Example 4.

EXAMPLE 23

The method for preparing the ink composition of the present example was the same with the method illustrated in Example 21, except that the dye composition prepared in Example 1 was substituted with the dye composition prepared in Example 6, and the dye composition prepared in Example 2 was substituted with the dye composition prepared in Example 7.

EXAMPLE 24

The method for preparing the ink composition of the present example was the same with the method illustrated in Example 21, except that the dye composition prepared in Example 1 was substituted with the dye composition prepared in Example 8, and the dye composition prepared in Example 2 was substituted with the dye composition prepared in Example 12.

COMPARATIVE EXAMPLE 1

Preparation of a Dye Composition 100 parts of Reactive Red 180 (commercially available form Everlight Chemical Industrial Corp.) was mixed with 300 parts of water, followed by adjusting the pH value of the resulted solution to 6-8. Reverse osmosis was performed to remove the salts from the resulted solution, and the content of salt is less than 0.5% by weight after desalination. Then, 2 parts of the compound of the formula (II-1) was added into the resulted solution, followed by mixing and adjusting the pH value to 6.5-7.5. Finally, the resulted solution was dried by spray drying to obtain a dye composition.

COMPARATIVE EXAMPLE 2

Preparation of a Dye Composition 50 parts of the compound of the formula (I-1), and 50 parts of the compound of the formula (I-2) were mixed with 300 parts of water, followed by adjusting the pH value of the resulted solution to 6-8. Reverse osmosis was performed to remove the salts from the resulted solution, and the content of salt is less than 0.5% by weight after desalination. Then, the pH value of the resulted solution was adjusted to 6.5-7.5. Finally, the resulted solution was dried by spray drying to obtain a dye composition.

COMPARATIVE EXAMPLE 3

Preparation of a Dye Composition 100 parts of the compound of the formula (I-4) was mixed with 300 parts of water, followed by adjusting the pH value of the resulted solution to 6-8. Reverse osmosis was performed to remove the salts from the resulted solution, and the content of salt is less than 0.5% by weight after desalination. Then, the pH value of the resulted solution was adjusted to 6.5-7.5. Finally, the resulted solution was dried by spray drying to obtain a dye composition.

COMPARATIVE EXAMPLE 4

Preparation of a Dye Composition 50 parts of the compound of the formula (I-1), and 50 parts of the compound of the formula (I-2) were mixed with 300 parts of water, followed by adjusting the pH value of the resulted solution to 6-8. Reverse osmosis was performed to remove the salts from the resulted solution, and the content of salt is less than 0.5% by weight after desalination. Then, 2 parts of N,N-diethylaniline sulfonic acid (DEAS) was added into the resulted solution, followed by mixing and adjusting the pH value to 6.5-7.5. Finally, the resulted solution was dried by spray drying to obtain a dye composition.

COMPARATIVE EXAMPLE 5

Preparation of a Dye Composition 50 parts of the compound of the formula (I-4) was mixed with 300 parts of water, followed by adjusting the pH value of the resulted solution to 6-8. Reverse osmosis was performed to remove the salts from the resulted solution, and the content of salt is less than 0.5% by weight after desalination. Then, 2 parts of N,N-diethylaniline sulfonic acid (DEAS) was added into the resulted solution, followed by mixing and adjusting the pH value to 6.5-7.5. Finally, the resulted solution was dried by spray drying to obtain a dye composition.

COMPARATIVE EXAMPLE 6

Preparation of a Dye Composition 50 parts of the compound of the formula (I-1), and 50 parts of the compound of the formula (I-2) were mixed with 300 parts of water, followed by adjusting the pH value of the resulted solution to 6-8. Reverse osmosis was performed to remove the salts from the resulted solution, and the content of salt is less than 0.5% by weight after desalination. Then, 2 parts of sodium tripolyphosphate (STPP) was added into the resulted solution, followed by mixing and adjusting the pH value to 6.5-7.5. Finally, the resulted solution was dried by spray drying to obtain a dye composition.

COMPARATIVE EXAMPLE 7

Preparation of an Ink Composition 15 parts of the dye composition prepared in Comparative example 1, 10 parts of N-methyl-2-pyrrolidone, 10 parts of 2-pyrrolidone, 0.5 parts of surfactant Surfynol 465, 0.2 parts of microbicide Proxel XL2, and water, in the sum of 100 parts, are mixed by a mixing machine for 30 min. Then, absolute filtration was performed on the mixture with 0.45 μm filter paper to obtain an ink composition.

COMPARATIVE EXAMPLE 8

The method for preparing the ink composition of the present comparative example was the same with the method illustrated in Comparative example 7, except that the dye composition prepared in Comparative example 1 was substituted with the dye composition prepared in Comparative example 2.

COMPARATIVE EXAMPLE 9

The method for preparing the ink composition of the present comparative example was the same with the method illustrated in Comparative example 7, except that the dye composition prepared in Comparative example 1 was substituted with the dye composition prepared in Comparative example 3.

COMPARATIVE EXAMPLE 10

The method for preparing the ink composition of the present comparative example was the same with the method illustrated in Comparative example 7, except that the dye composition prepared in Comparative example 1 was substituted with the dye composition prepared in Comparative example 4.

COMPARATIVE EXAMPLE 11

The method for preparing the ink composition of the present comparative example was the same with the method illustrated in Comparative example 7, except that the dye composition prepared in Comparative example 1 was substituted with the dye composition prepared in Comparative example 5.

COMPARATIVE EXAMPLE 12

The method for preparing the ink composition of the present comparative example was the same with the method illustrated in Comparative example 7, except that the dye composition prepared in Comparative example 1 was substituted with the dye composition prepared in Comparative example 6.

Test Result (1) Spray Drying Test on the Dye Composition

The dye composition prepared in Examples 1-12 and Comparative examples 1-5 were tested by drying through spray drying under high temperature, and the changes in the pH value of these dye compositions were measured. The test results are listed in following Table 1.

TABLE 1

Changes in the pH value of the dye compositions before and after spray drying

| No. | pH (Liq) | Spray drying Temperature of the outlet | Temperature of the inlet | pH (Powder)*1 | pH difference*2 |
|---|---|---|---|---|---|
| Example 1 | 7.0 | 130° C. | 220° C. | 6.8 | 0.2 |
| Example 2 | 7.0 | 130° C. | 220° C. | 6.5 | 0.5 |
| Example 3 | 7.0 | 130° C. | 220° C. | 6.6 | 0.4 |
| Example 4 | 7.0 | 130° C. | 220° C. | 6.8 | 0.2 |
| Example 5 | 7.0 | 130° C. | 220° C. | 6.8 | 0.2 |
| Example 6 | 7.0 | 130° C. | 220° C. | 6.7 | 0.3 |
| Example 7 | 7.0 | 130° C. | 220° C. | 6.8 | 0.2 |
| Example 8 | 7.0 | 130° C. | 220° C. | 6.7 | 0.3 |
| Example 9 | 5.0 | 130° C. | 220° C. | 5.0 | 0.0 |
| Example 10 | 7.0 | 130° C. | 220° C. | 7.0 | 0.0 |
| Example 11 | 7.0 | 130° C. | 220° C. | 6.9 | 0.1 |
| Example 12 | 7.0 | 130° C. | 220° C. | 7.0 | 0.0 |
| Comparative example 1 | 7.0 | 130° C. | 220° C. | 5.9 | 1.1 |
| Comparative example 2 | 7.0 | 130° C. | 220° C. | 4.7 | 2.3 |
| Comparative example 3 | 7.0 | 130° C. | 220° C. | 5.5 | 1.5 |
| Comparative example 4 | 7.0 | 130° C. | 220° C. | 5.6 | 1.4 |
| Comparative example 5 | 7.0 | 130° C. | 220° C. | 5.8 | 1.2 |

*1pH (Powder): The pH value of a dye solution of 1% by weight, which is prepared by mixing 1 g of a dried dye composition with water.
*2pH difference: The difference in the pH value of the dye solution before and after spray drying.

From the results shown in Table 1, the pH values of all the dye compositions prepared in Examples of the present invention can maintain stable, during the process of spray drying from 220° C. to 130° C. Therefore, the dye compositions of the present invention are suitable for preparing an ink composition for digital textile printing. However, the pH differences of the dye compositions prepared in Comparative examples are much larger than the pH differences of the dye compositions prepared in Examples, which means that the dye compositions prepared in Comparative examples have poor stability. Therefore, the dye compositions prepared in Comparative examples are not suitable for preparing an ink composition for digital textile printing.

(2) Comparison of Quality of the Ink Composition for Digital Textile Printing (a) The ink composition prepared by Examples 13-24 and Comparative examples 7-12 were printed on pretreated textiles.

The textile used herein is a woven fabric. Before printing, the woven fabric was treated with a treatment solution, pick-up 70%, by pad-roll process, followed by drying by heat.

| Treatment solution | |
|---|---|
| Sodium alginate | 6 wt % |
| Urea | 10 wt % |
| Reduction inhibitor | 1 wt % |
| Sodium bicarbonate | 2 wt % |
| Water | 81 wt % |
| | 100 wt % |

(b) The resulted pictures were treated through the following method:

The textiles printed with the ink composition of Examples 13-24 and Comparative examples 7-12 were dried under 80° C. for 5 min, and then the textiles were brought to fixation in 102-110° C. steam for 8-15 min. The textiles were washed with 100C. solution containing a certain ratio of detergent, respectively. After drying, the tests on printability, time-dependent printability, relative strength, and color deterioration were performed, and the results are listed in following Table 2. "Printability" means the printing condition of the ink composition; "time-dependent printability" means the printing condition of the ink composition, which is stored under 50° C. for 2 weeks; "relative strength" means the color strength comparison of the printing after washing, wherein the printing is obtained from the tests on printability and time-dependent printability; and "color deterioration" means a relative degree of deterioration between the color strength of the ink composition stored under 50° C. for 2 weeks (i.e. test on "time-dependent printability") and the color strength of the original ink composition (i.e. test on "printability").

TABLE 2

Test results of the ink compositions for digital textile printing

| No. | Printability*1 | Time-dependent printability*1 | Relative strength*2 | Color deterioration*2 |
|---|---|---|---|---|
| Example 13 | ◉ | ◉ | 97% | −3% |
| Example 14 | ◉ | ◉ | 100% | −0% |
| Example 15 | ◉ | ◉ | 96% | −4% |
| Example 16 | ◉ | ◉ | 97% | −3% |
| Example 17 | ◉ | ◉ | 98% | −2% |
| Example 18 | ◉ | ◉ | 100% | −0% |
| Example 19 | ◉ | ◉ | 97% | −3% |
| Example 20 | ◉ | ◉ | 98% | −2% |
| Example 21 | ◉ | ◉ | 95% | −5% |
| Example 22 | ◉ | ◉ | 96% | −4% |
| Example 23 | ◉ | ◉ | 98% | −2% |
| Example 24 | ◉ | ◉ | 98% | −2% |
| Comparative example 7 | ○ | X | — | — |
| Comparative example 8 | ○ | X | 86% | −14% |
| Comparative example 9 | ○ | X | 85% | −15% |
| Comparative example 10 | ◉ | ○ | 90% | −10% |

TABLE 2-continued

Test results of the ink compositions for digital textile printing

| No. | Printability*[1] | Time-dependent printability*[1] | Relative strength*[2] | Color deterioration*[2] |
|---|---|---|---|---|
| Comparative example 11 | ⊚ | ○ | 91% | −9% |
| Comparative example 12 | ○ | X | — | — |

*[1] ⊚ means 0-5 nozzles are clogged after printing continuously for 1 hour, i.e. good printability; ○ means 6-15 nozzles are clogged after printing continuously for 1 hour, i.e. normal printability; and X means more than 15 nozzles are clogged after printing continuously for 1 hour, i.e. poor printability.

*[2] After the test on printability is performed, the color strength of the printing is regarded as 100%, wherein — means poor printability of the ink composition so that it is impossible to measure the relative strength of the printing.

From the results shown in Table 2, any kinds of the ink composition prepared in Examples of the present invention shows good "printability" and "time-dependent printability". Furthermore, the ink compositions prepared in Examples of the present invention also have good stability under high temperature.

The ink composition for digital textile printing, which is prepared by the dye composition of the present invention, has excellent "printability" and "time-dependent printability", and the color deterioration in color strength can be controlled within 5%. Furthermore, the ink composition prepared by the dye composition of the present invention can be printed on cellulose fibers, and the regeneration fibers thereof, including cotton, rayon, and natural fibers, such as silk or wool.

In conclusion, the present invention is different from the prior arts in several ways, such as in purposes, methods and efficiency, or even in technology and research and design. Although the present invention has been explained in relation to its preferred embodiment, it is to be understood that many other possible modifications and variations can be made without departing from the scope of the invention as hereinafter claimed.

What is claimed is:

1. An ink composition for digital textile printing, comprising:
   (A) at least one reactive dye of the following formulas (I-1), (I-3) to (I-7), and (I-9) to (I-14), or a salt thereof,

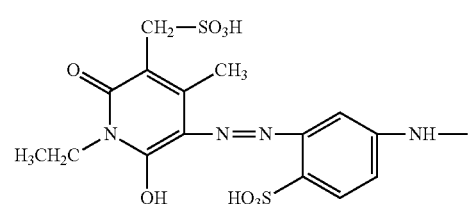

(I-1)

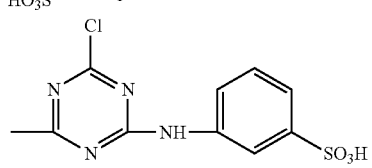

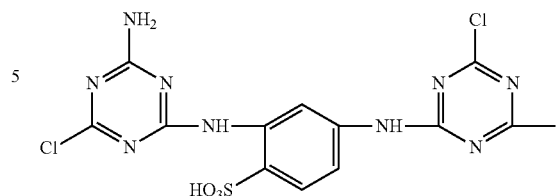

(I-3)

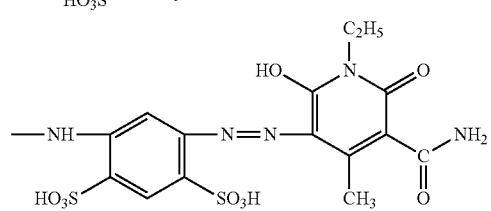

(I-4)

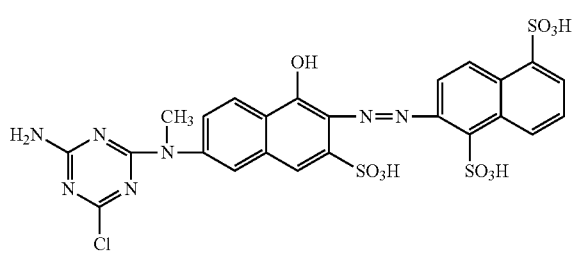

(I-5)

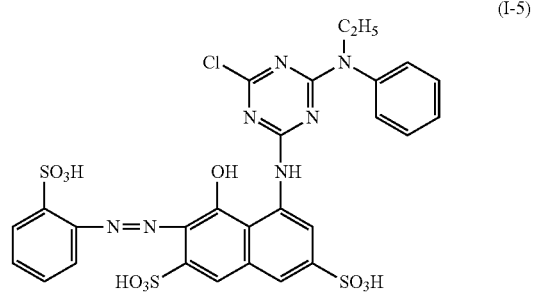

(I-6)

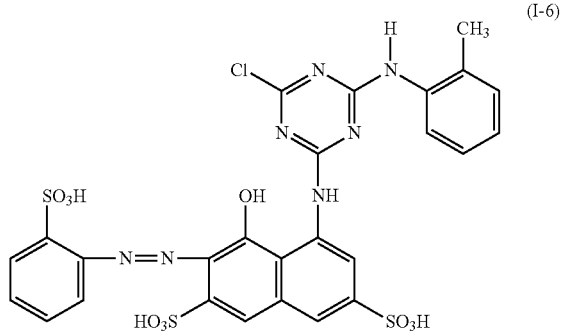

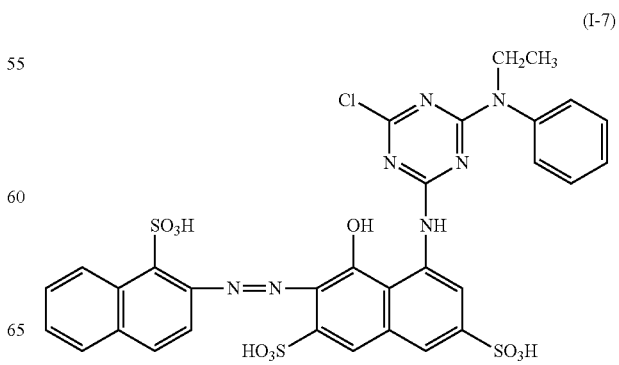

(I-7)

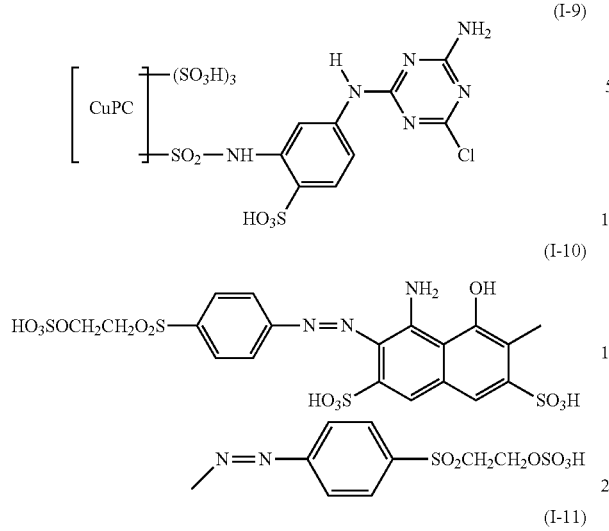

(I-9)

(I-10)

(I-11)

(I-12)

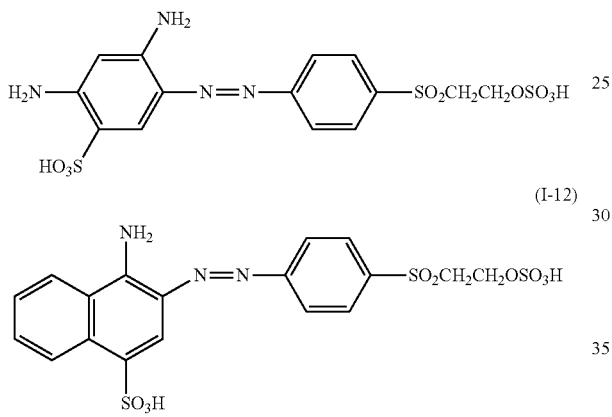

(I-13)

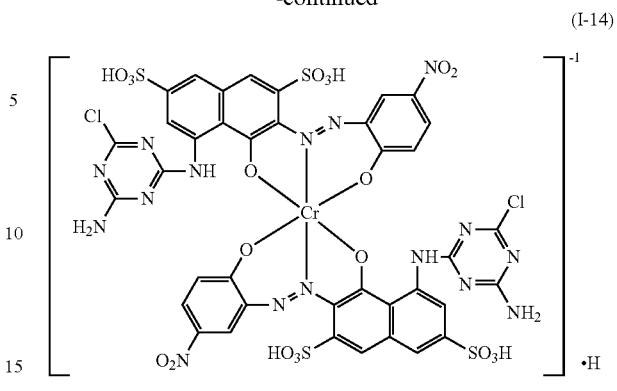

(I-14)

wherein, the content of the component (A) is 95~99.9% by weight; and (B) at least one organic buffer of the following formulas (I-1) to (II-2), or a salt thereof,

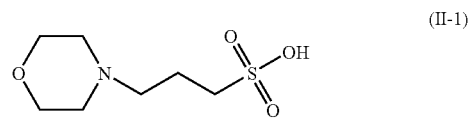

(II-1)

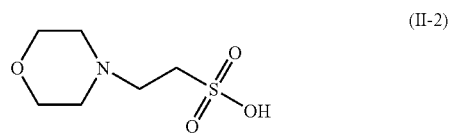

(II-2)

wherein, the content of the component (B) is 0.1~5% by weight.

2. The ink composition as claimed in claim 1, wherein the component (A) is the reactive dye of the formulas (I-1), (1-3) to (I-7) and (I-9) to (I-12), or a salt thereof.

3. The ink composition as claimed in claim 1, wherein the component (B) is the organic buffer of the formula (II-1), or a salt thereof.

4. The ink composition as claimed in claim 1, wherein the component (B) is the organic buffer of formula (II-2), or a salt thereof.

5. An ink composition for digital textile printing, comprising:

(A) at least one reactive dye of the following formulas (I-1), (I-3) to (I-7), and (I-9) to (I-14), or a salt thereof,

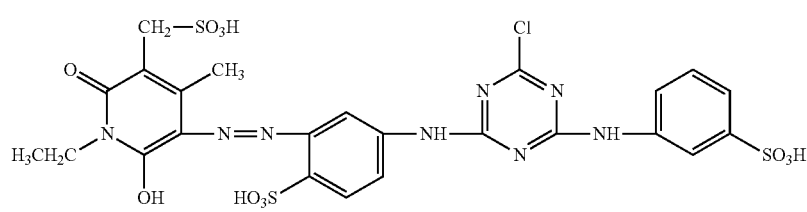

(I-1)

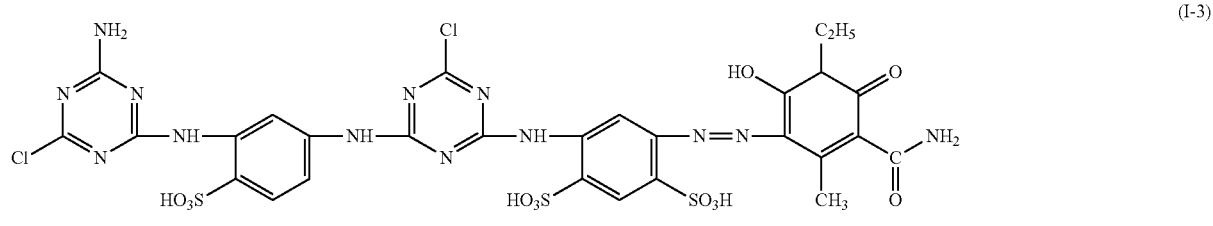
(I-3)
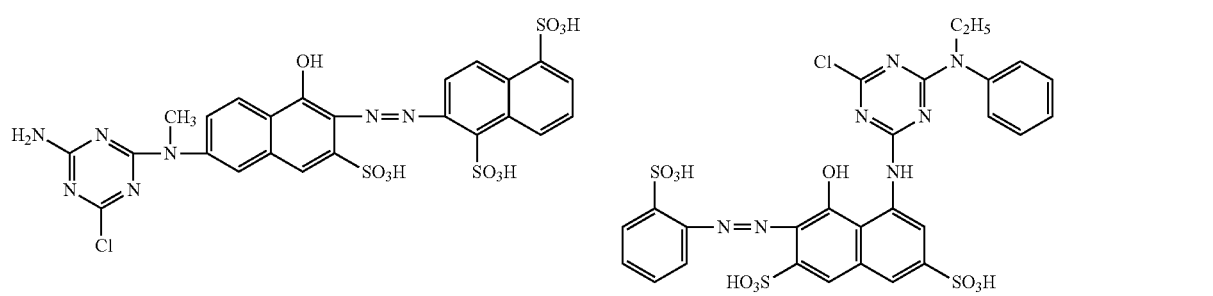
(I-4)
(I-5)
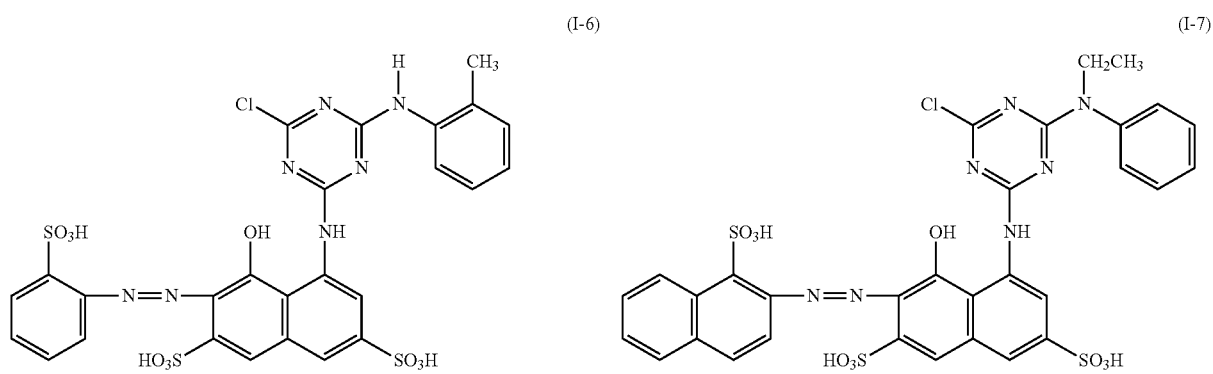
(I-6)
(I-7)
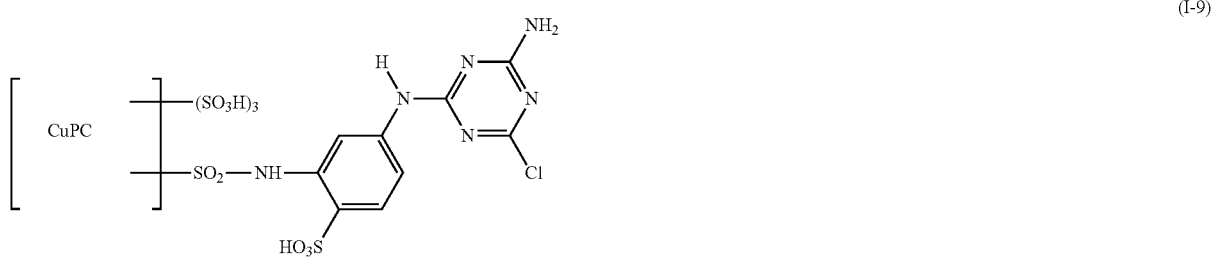
(I-9)
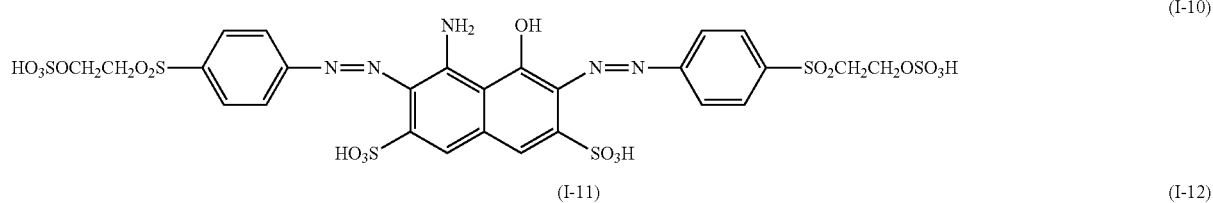
(I-10)
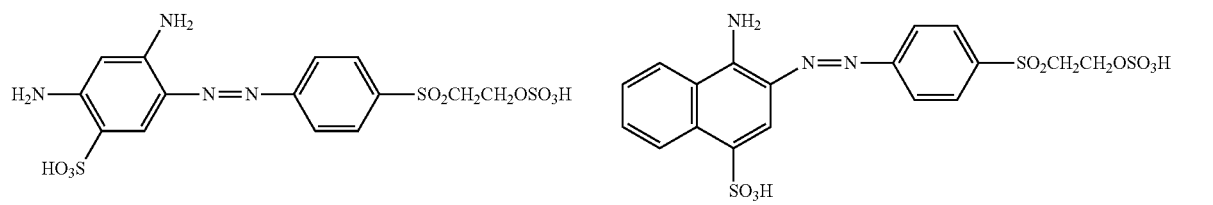
(I-11)
(I-12)

-continued

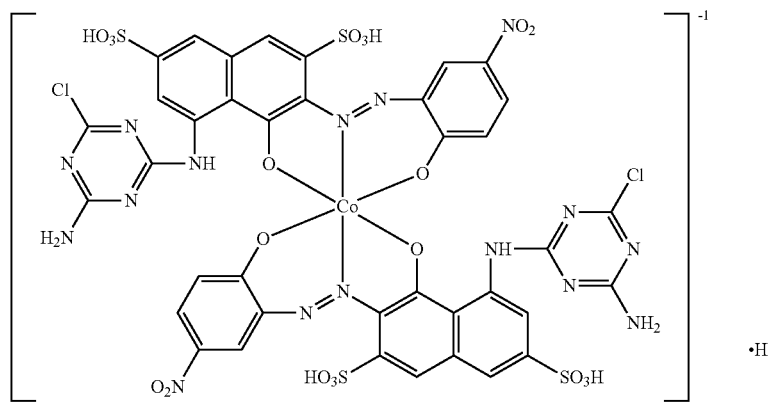

(I-13)

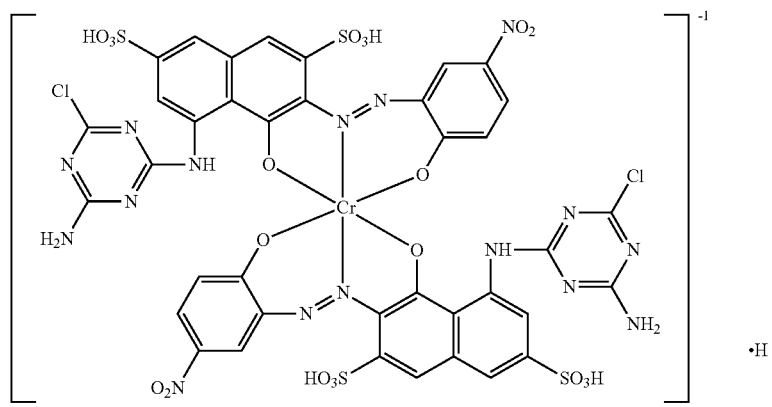

(I-14)

wherein, the content of the component (A) is 0.095~33.25% by weight;

(B) at least one organic buffer of the following formulas (II-1) to (II-2), or a salt thereof,

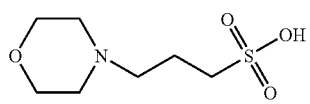

(II-1)

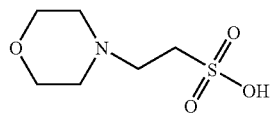

(II-2)

wherein, the content of the component (B) is 0.005~1.75% by weight;

(C) an organic solvent selected from the group consisting of ethylene glycol, diethylene glycol, triethylene glycol, propylene glycol, butylene glycol, ethylene glycol monoethyl ether, ethylene glycol monobutyl ether, diethylene glycol monobutyl ether, diethylene glycol monoethyl ether, diethylene glycol monomethyl ether, glycerine, 2-pyrrolidone, N-methyl-2-pyrrolidone, 1,3-dimethyl-2-imidazolidinone, and triethanolamine, wherein the content of the component (C) is 5~35% by weight; and (D) water, wherein the content of the component (D) is 30~94.9% by weight.

6. The ink composition as claimed in claim 5, wherein the component (A) is the reactive dye of the formulas (I-1), (I-3) to (I-7) and (I-9) to (I-12), or a salt thereof.

7. The ink composition as claimed in claim 5, wherein the component (B) is the organic buffer of the formula (II-1), or a salt thereof.

8. The ink composition as claimed in claim 5, wherein the component (B) is the organic buffer of the formula (II-2), or a salt thereof.

* * * * *